(12) United States Patent
Mabry et al.

(10) Patent No.: US 7,193,015 B1
(45) Date of Patent: Mar. 20, 2007

(54) NANOSTRUCTURED CHEMICALS AS ALLOYING AGENTS IN FLUORINATED POLYMERS

(76) Inventors: Joseph M. Mabry, 42229 - 57th St. West, Lancaster, CA (US) 93536; Rene I. Gonzalez, 28 Paseo del Parque Urb. Los Paseos, San Juan, PR (US) 00926; Rusty L. Blanski, 44448 Overland Ave., Lancaster, CA (US) 93536; Patrick N. Ruth, 810 S. Mill St., Tehachapi, CA (US) 93561; Brent D. Viers, 2542 Stillwater Dr., Lancaster, CA (US) 93536; Joseph J. Schwab, 16352 Bradbury, Huntington Beach, CA (US) 92647; Joseph D. Lichtenhan, 2 Chestnut Point, Petal, MS (US) 39465

( * ) Notice: Subject to any disclaimer, the term of this patent is extended or adjusted under 35 U.S.C. 154(b) by 152 days.

(21) Appl. No.: 10/815,544

(22) Filed: Mar. 31, 2004

Related U.S. Application Data (63) Continuation-in-part of application No. 09/818,265, filed on Mar. 26, 2001, now Pat. No. 6,716,919.

(60) Provisional application No. 60/459,357, filed on Mar. 31, 2003, provisional application No. 60/192,083, filed on Mar. 24, 2000.

(51) Int. Cl.
*C08F 8/00* (2006.01)

(52) U.S. Cl. ...................... 525/101; 525/104

(58) Field of Classification Search ........... 525/101, 525/104
See application file for complete search history.

(56) References Cited

U.S. PATENT DOCUMENTS

| | | | | |
|---|---|---|---|---|
| 5,047,492 A | * | 9/1991 | Weidner et al. | 528/15 |
| 5,412,053 A | * | 5/1995 | Lichtenhan et al. | 528/9 |
| 5,484,867 A | * | 1/1996 | Lichtenhan et al. | 528/9 |
| 5,589,562 A | * | 12/1996 | Lichtenhan et al. | 528/9 |
| 5,726,247 A | * | 3/1998 | Michalczyk et al. | 525/102 |
| 5,876,686 A | * | 3/1999 | Michalczyk et al. | 423/592.1 |
| 5,939,576 A | * | 8/1999 | Lichtenhan et al. | 556/460 |
| 5,942,638 A | * | 8/1999 | Lichtenhan et al. | 556/460 |
| 6,075,068 A | * | 6/2000 | Bissinger | 523/116 |
| 6,100,417 A | * | 8/2000 | Lichtenhan et al. | 556/460 |
| 6,228,904 B1 | * | 5/2001 | Yadav et al. | 523/210 |
| 6,245,849 B1 | * | 6/2001 | Morales et al. | 524/442 |

* cited by examiner

*Primary Examiner*—Bernard Lipman
(74) *Attorney, Agent, or Firm*—David H. Jaffer; Pillsbury Winthrop Shaw Pittman LLP (57) ABSTRACT

A method of using nanostructured chemicals as alloying agents for the reinforcement of flouropolymer microstructures, including polymer coils, domains, chains, and segments, at the molecular level. Because of their tailorable compatibility with fluorinated polymers, nanostructured chemicals can be readily and selectively incorporated into polymers by direct blending processes. Properties most favorably improved are time dependent mechanical and thermal properties such as heat distortion, creep, compression set, shrinkage, modulus, hardness and abrasion resistance. In addition to mechanical properties, other physical properties are favorably improved, including lower thermal conductivity, fire resistance, and improved oxygen permeability. These improved properties may be useful in a number of applications, including space-survivable materials and creep resistant seals and gaskets. Improved surface properties may be useful for applications such as anti-icing or non-wetting surfaces or as low friction surfaces.

19 Claims, 6 Drawing Sheets

NANOSTRUCTURED CHEMICALS AS ALLOYING AGENTS IN FLUORINATED POLYMERS

CROSS-REFERENCE TO RELATED APPLICATIONS

This application claims the benefit of U.S. Provisional Application No. 60/459,357 filed on Mar. 31, 2003, and is a continuation-in-part of U.S. patent application Ser. No. 09/818,265 filed Mar. 26, 2001, now U.S. Pat. No. 6,716,919, which claims the benefit of U.S. Provisional Application No. 60/192,083, filed Mar. 24, 2000.

FIELD OF THE INVENTION

This invention relates generally to methods for enhancing the properties of thermoplastic and thermoset fluorinated polymer and fluid compositions and, more particularly, to methods for the incorporation of nanostructured chemicals into fluorinated polymers and fluorinated fluids.

This invention also relates to several applications of the fluorinated polymers with improved properties. These applications include space-survivable materials and creep resistant seals and gaskets. Improved polymer surface properties may be useful for applications such as anti-icing or non-wetting surfaces or as low friction surfaces.

BACKGROUND OF THE INVENTION

It has long been recognized that the properties of polymers can be tailored to a high degree through variables such as polymer sequence, structure, additive and filler incorporation, composition, morphology, thermodynamic and kinetic processing control. It is similarly known that various sizes and shapes of fillers, and particulates (e.g. calcium carbonate, silica, carbon black etc.) can be incorporated into preformed polymers or prepolymers or monomer mixtures to enhance physical and material properties of the resulting formulations.

Figure 1:
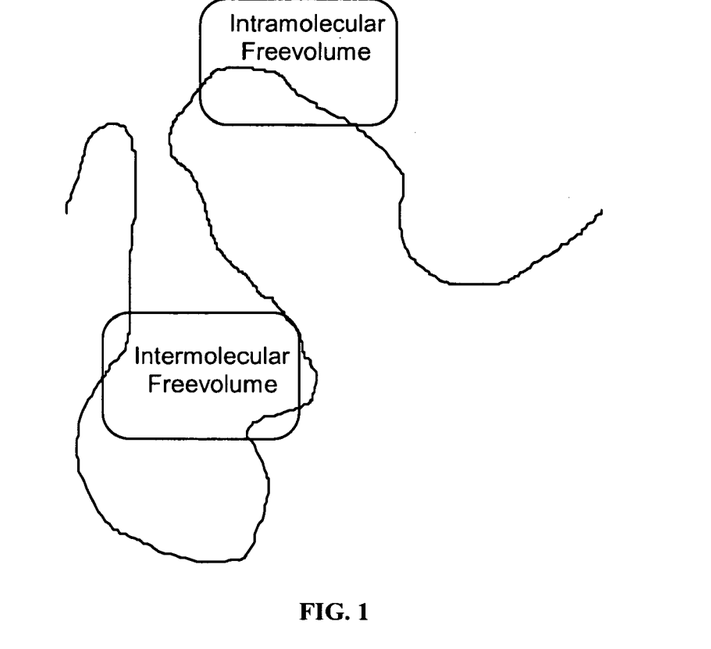
FIG. 1 shows the relative positions of an internal free volume and an external free volume of a polymer.

In their solid state all polymers (including amorphous, semi-crystalline, crystalline, and rubber, etc.) possess considerable amounts of internal and external free volume (see FIG. 1). The free volume of a polymer has a tremendous impact on its physical properties, since it is within this volume that the dynamic properties (e.g. reptation, translation, rotation, crystallization) of polymer chains primarily operate and in turn influence fundamental physical properties such as density, thermal conductivity, glass transition, melt transition, modulus, relaxation, and stress transfer.

Figure 2:
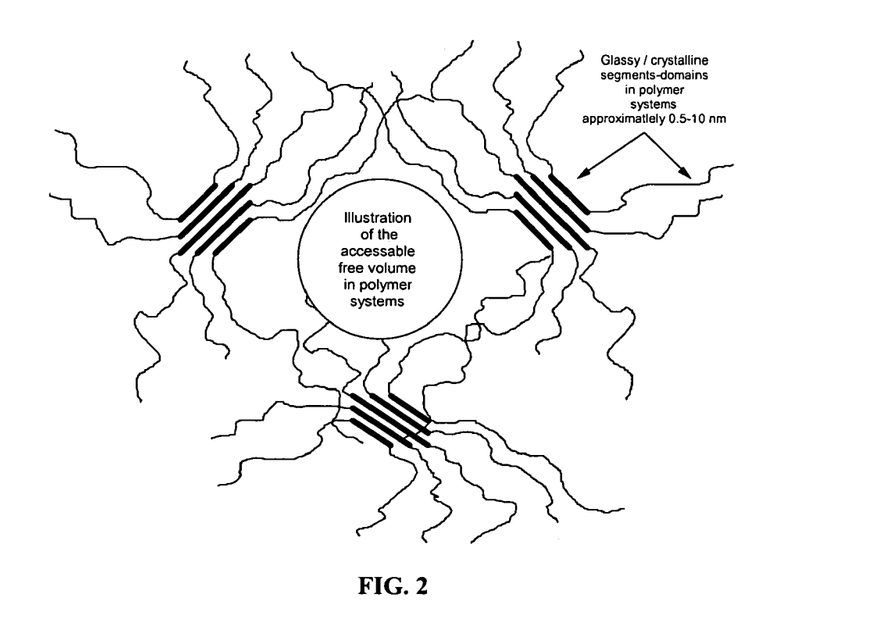
FIG. 2 illustrates some different regions and phase separation within a polymer.

The accessibility of free volume in a polymer system depends greatly on its morphology and on the size of the agent desired to occupy the free volume. As shown in FIG. 2, for example, denser regions and phase separation within a polymer can both increase and decrease the thermodynamic and kinetic access to such areas. Because of its influence on thermodynamic and kinetic properties, polymer morphology and free volume dimension are major factors that limit the ability of conventional fillers from accessing the free volume regions in a polymer system. Additional processing/compounding effort is normally required to force compatibilization between a filler and a polymer system because conventional fillers are physically larger than most polymer dimensions, are chemically dissimilar, and usually are high melting solids.

Figure 4:
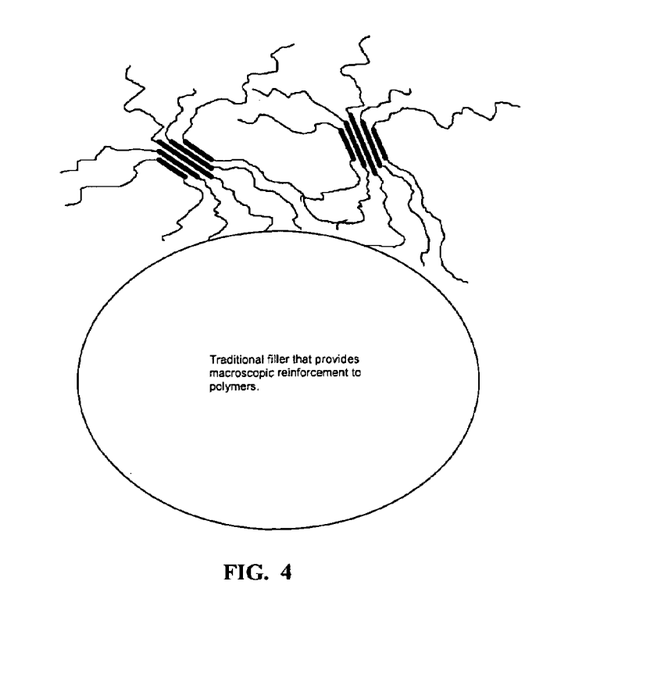
FIG. 4 illustrates the macroscopic reinforcement a traditional filler provides to polymers.
Figure 5:
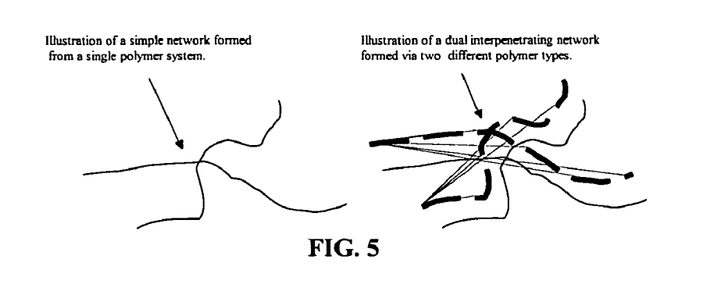
FIG. 5 illustrates the lack of geometrical definition of interpenetrating network polymers.

Prior art in fluoropolymers has focused on modifications through the formation of an inorganic interpenetrating network that is either partially or fully condensed and is in contact with or dispersed amoungst the fluoropolymer chains. See U.S. Pat. Nos. 5,876,686 and 5,726,247. Similarily modifications have been described that enhance properties through the continuous or discontinuous dispersion of macro, micro and nanoscale particulates of a dissimilar composition (e.g. inorganic) relative to that of the fluoropolymer. In either case the function of the inorganic network or filler particle is to reduce the relative slippage or motion of the fluoropolymer chains and segments relative to each other. The combination of reduced chain motion with the thermally stable inorganic component utlimately enhances physical properties such as dimensional stability, impact resistance, tensile and compressive strengths, thermal stability, electrical properties, abrasion and chemical resistance, shrinkage and expansion reduction. Unfortunately, all of the prior art either suffers from process complexity, a length scale of the reinforcement that is too large to sufficiently access polymer free volume, or reinforcement that lacks sufficient geometrical definition to provide structure regularity and reinforcement at the molecular ($10^{-10}$ m) and nanoscopic ($10^{-9}$ m) length scales. As illustrated in FIG. 4, fillers are geometrically ill defined solid particulates that macroscopically or nanoscopically reinforce large associated or nearby groups of polymers rather than the individual chains and segments within these polymers. As illustrated in FIG. 5, incompletely condensed or completely condensed interpenetrating networks also lack sufficient geometrical definition to provide structure regularity and reinforcement of fluoropolymer chains.

Furthermore, it has been calculated that as filler sizes decrease below 50 nm, they would become more resistant to sedimentation and more effective at providing reinforcement to polymer systems. The full application of this theoretical knowledge, however, has been thwarted by the lack of a practical source of particulate reinforcement or reinforcements which are geometrically well defined, and monodisperse and with diameters below the 10 nm range and especially within the 1 nm to 5 nm range. Particularly desirable are monodisperse, nanoscopically sized chemicals with precise chemical compositions, rigid and well defined geometrical shapes, and which are dimensionally large enough to provide reinforcement of polymer chains. Such nanoscopic chemicals are desirable as they are expected to form the most stable dispersions within polymer systems, would be well below the length scale necessary to scatter light and hence are visually nondetectable when incorporated into fluoropolymers, and would be chemically compatible with fluoropolymers and dissolve into and among the polymer chains, thus eliminating the need for extensive dispersion or reactive self assembly or the complex processing requirements of the prior art.

Recent developments in nanoscience have enabled the ability to cost effectively manufacture commercial quantities of materials that are best described as nanostructured chemicals due to their specific and precise chemical formula, hybrid (inorganic-organic) chemical composition, large physical size relative to the size of traditional chemical molecules (0.3–0.5 nm), and small physical size relative to larger sized traditional fillers (>50 nm).

Figure 3:
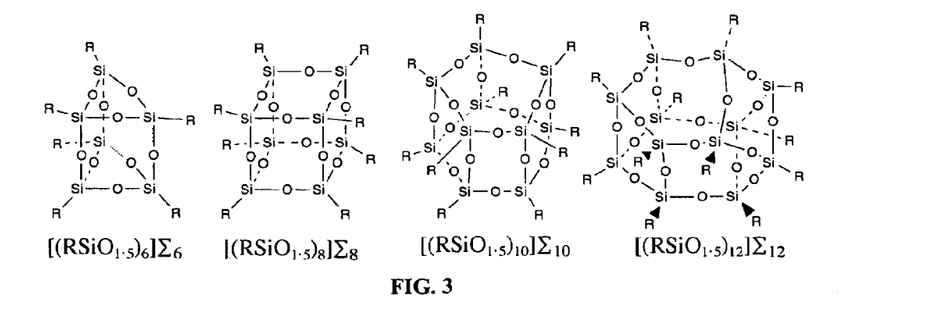
FIG. 3 illustrates some representative examples of monodisperse nanostructured chemicals.

Nanostructured chemicals are best exemplified by those based on low-cost Polyhedral Oligomeric Silsesquioxanes (POSS) and Polyhedral Oligomeric Silicates (POS). FIG. 3 illustrates some representative examples of monodisperse nanostructured chemicals, which are also known as POSS Molecular Silicas.

These systems contain hybrid (i.e., organic-inorganic) compositions in which the internal frameworks are primarily comprised of inorganic silicon-oxygen bonds. The exterior of a nanostructure is covered by both reactive and nonreactive organic functionalities (R), which ensure compatibility and tailorability of the nanostructure with organic polymers. These and other properties of nanostructured chemicals are discussed in detail in U.S. Pat. Nos. 5,412,053 and 5,484,867, both are expressly incorporated herein by reference in their entirety. These nanostructured chemicals are of low density, exhibit excellent inherent fire retardancy, and can range in diameter from 0.5 nm to 5.0 nm.

Prior art associated with fillers, plasticizers, interpenetrating networks, and polymer morphology has not been able to adequately control polymer chain, coil and segmental motion at the 1 nm–10 nm level. Furthermore, the mismatch of chemical potential (e.g., solubility, miscibility, etc.) between fluoro-based polymers and inorganic-based fillers and chemicals results in a high level of heterogeneity in compounded polymers that is akin to oil mixed with water. Therefore, there exists a need for appropriately sized chemical reinforcements for polymer systems with controlled diameters (nanodimensions), distributions and with tailorable chemical functionality. In addition, it would be desirable to have easily compoundable nanoreinforcements that have chemical potential ranges (misibilities) similar to the various fluorinated polymer and fluorinated fluid systems.

SUMMARY OF THE INVENTION

The present invention describes methods of preparing new polymer compositions by incorporating nanostructured chemicals into polymers. The resulting nano-alloyed polymers are wholly useful by themselves or in combination with other polymers or in combination with macroscopic reinforcements such as fiber, clay, glass mineral and other fillers. The nano-alloyed polymers are particularly useful for producing polymeric compositions with desirable physical properties such as adhesion to polymeric, composite and metal surfaces, water repellency, reduced melt viscosity, low dielectric constant, resistance to abrasion and fire, biological compatibility, and optical quality plastics. The preferred compositions presented herein contain two primary material combinations: (1) nanostructured chemicals, nanostructured oligomers, or nanostructured polymers from the chemical classes of polyhedral oligomeric silsesquioxanes, polysilsesquioxanes, polyhedral oligomeric silicates, polysilicates, polyoxometallates, carboranes, boranes, and polymorphs of carbon; and (2) fluorinated polymer systems such as: PFA, MFA, PVDF, semicrystalline, crystalline, glassey, elastomeric, oils, and lubricants thereof as derived from hydrocarbons, or silicones and fluoropolymers or copolymers thereof.

Preferably, the method of incorporating nanostructured chemicals into such fluoropolymers is accomplished via blending of the chemicals into the polymers. All types and techniques of blending, including melt blending, dry blending, solution blending, reactive and nonreactive blending are effective.

In addition, selective incorporation of a nanostructured chemical into a specific region of a polymer can be accomplished by compounding into the polymer a nanostructured chemical with a chemical potential (miscibility) compatible with the chemical potential of the region within the polymer to be alloyed. Because of their chemical nature, nanostructured chemicals can be tailored to show compatibility or incompatibility with selected sequences and segments within polymer chains and coils. Their physical size in combination with their tailorable compatibility enables nanostructured chemicals to be selectively incorporated into fluoroplastics and control the dynamics of coils, blocks, domains, and segments, and subsequently favorably impact a multitude of physical properties. Properties most favorably improved are time dependent mechanical and thermal properties such as heat distortion, creep, compression set, shrinkage, modulus, hardness and abrasion resistance. In addition to mechanical properties, other physical properties are favorably improved, including lower thermal conductivity, improved fire resistance, and improved oxygen permeability, improved oxidative stability, improved electrical properties and printability.

Creep Resistant Seals and Gaskets

While many fluoropolymers, such as polytetrafluoroethylene (PTFE or Teflon) and fluorinated ethylene/propylene (FEP) are resistant to organic fuels and fluids, creep is often a problem. Creep is the change in dimensions of a molded part resulting from cold flow incurred by continual loading and can cause a polymer press-fit to loosen to an unacceptable condition or even fail. Tensile strength is an important factor in controlling the amount of cold flow in plastics. The higher the tensile strength, the more resistant the plastic is to cold flow and creep. PTFE, for example, has a very low tensile strength. In addition to improving thermal and mechanical properties of fluoropolymers, blended fluorinated POSS reduces the amount of creep. The processing temperature of nearly all fluoropolymers is sufficient to allow the blending of POSS materials. A notable exception is PTFE. While the processing temperature of PTFE is too high to allow conventional blending, supercritical methods may allow fluorinated POSS to be incorporated into PTFE.

Space-survivable Fluorinated Materials

Fluorinated POSS can be blended into several fluoropolymers, including poly(vinylidinefluoride) (PVDF) and FEP, both of which are used in spacecraft coatings. These compounds significantly improve oxidation resistance due to a rapidly forming ceramic-like, passivating and self-healing silica layer when exposed to high incident fluxes of atomic oxygen (AO). AO is the predominant species in low earth orbit (LEO) responsible for material degradation. This is because the collision energy of AO (~5 eV) exceeds the bond strength of carbon—carbon bonds in fluoropolymers (~4.3 eV). The silicon-oxygen bonds present in the POSS cage have stronger bond dissociation energies (~8.3 eV). The POSS cage is not destroyed by the AO, but forms a passivating self-rigidizing/self-healing silica layer, which protects the underlying virgin polymer.

Anti-icing or Non-wetting Applications

Fluorinated POSS films show remarkable surface properties. The contact angle of water on a spin-cast surface of fluorodecyl POSS is 140° in an unoptimized process. Surprisingly, this is 30 degrees higher than PTFE. A higher the contact angle indicates lower surface energy. These fluorinated POSS compounds have the potential to form ultrahydrophobic surfaces and also reduce the surface energy of the fluoropolymers into which they are blended. This also leads to increased abrasion resistance and lubricity. Anti-icing or non-wetting applications may be possible using this technology. Lubricants and low friction surfaces can also be developed. These surfaces would be further enhanced by the creep reduction mentioned above.

DEFINITION OF FORMULA REPRESENTATIONS FOR NANOSTRUCTURES

For the purposes of understanding this invention's chemical compositions the following definitions for formula representations of Polyhedral Oligomeric Silsesquioxane (POSS) and Polyhedral Oligomeric Silicate (POS) nanostructures are made.

Polysilsesquioxanes are materials represented by the formula [RSiO$_{1.5}$]$_\infty$ where $\infty$ represents molar degree of polymerization and R=represents organic substituent (H, siloxy, cyclic or linear aliphatic or aromatic groups that may additionally contain reactive functionalities such as alcohols, esters, amines, ketones, olefins, ethers or halides or which may contain fluorinated groups). Polysilsesquioxanes may be either homoleptic or heteroleptic. Homoleptic systems contain only one type of R group while heteroleptic systems contain more than one type of R group.

POSS and POS nanostructure compositions are represented by the formula:

[(RSiO$_{1.5}$)$_n$]$_{\Sigma\#}$ for homoleptic compositions

[(RSiO$_{1.5}$)$_n$(R'SiO$_{1.5}$)$_m$]$_{\Sigma\#}$ for heteroleptic compositions (where R≠R')

[(RSiO$_{1.5}$)$_n$(RXSiO$_{1.0}$)$_m$]$_{\Sigma\#}$ for functionalized heteroleptic compositions (where R groups can be equivalent or inequivalent)

In all of the above R is the same as defined above and X includes but is not limited to OH, Cl, Br, I, alkoxide (OR), acetate (OOCR), peroxide (OOR), amine (NR$_2$) isocyanate (NCO), and R. The symbols m and n refer to the stoichiometry of the composition. The symbol $\Sigma$ indicates that the composition forms a nanostructure and the symbol # refers to the number of silicon atoms contained within the nanostructure. The value for # is usually the sum of m+n, where n ranges typically from 1 to 24 and m ranges typically from 1 to 12. It should be noted that $\Sigma\#$ is not to be confused as a multiplier for determining stoichiometry, as it merely describes the overall nanostructural characteristics of the system (aka cage size).

DETAILED DESCRIPTION OF THE INVENTION

The present invention teaches the use of nanostructured chemicals as alloying agents for the reinforcement of polymer coils, domains, chains, and segments at the molecular level.

The keys that enable nanostructured chemicals to function as molecular level reinforcing and alloying agents are: (1) their unique size with respect to polymer chain dimensions, and (2) their ability to be compatibilized with polymer systems to overcome repulsive forces that promote incompatibility and expulsion of the nanoreinforcing agent by the polymer chains. That is, nanostructured chemicals can be tailored to exhibit preferential affinity/compatibility with some polymer microstructures through variation of the R groups on each nanostructure. At the same time, the nanostructured chemicals can be tailored to be incompatible with other microstructures within the same polymer, thus allowing for selective reinforcement of specific polymer microstructure. Therefore, the factors to effect a selective nanoreinforcement include specific nanosizes of nanostructured chemicals, distributions of nanosizes, and compatabilities and disparities between the nanostrucutured chemical and the polymer system.

Nanostructured chemicals, such as the POSS Molecular Silicas illustrated in FIG. 3, are available as both solids and oils. Both forms dissolve in molten or in solvents, or directly into polymers thus solving the long-standing dispersion problem associated with traditional particulate fillers or the mixing complexities associated with interpenetrating networks. Moreover, because POSS nanocages dissolve into plastics at the molecular level, the forces (i.e., free energy) from solvation/mixing are sufficient to prevent POSS from coalescing and forming agglomerated domains as occurs with traditional and other organofunctionalized fillers. Agglomeration of particulate fillers has been a problem that has traditionally plagued formulators and molders.

Table 1 below relates the size range of POSS cages relative to polymer dimensions and filler sizes. The size of POSS is roughly equivalent to that of most polymer dimensions, thus at a molecular level POSS can effectively alter the motion of polymer chains.

TABLE 1

Relative sizes of POSS, polymer dimensions, and fillers.

| Particle Type | Particle Diameter |
| --- | --- |
| Amorphous Segments | 0.5–5 nm |
| Octacyclohexyl POSS | 1.5 nm |
| Random Polymer Coils | 5–10 nm |
| Particulate Silica | 9–80 nm |
| Crystalline Lamellae | 1.0–9,000 nm |
| Fillers/Organoclays | 2–100,000 nm |

The ability of POSS to control chain motion is particularly apparent when POSS is grafted onto a polymer chain.

See U.S. Pat. Nos. 5,412,053; 5,484,867; 5,589,562; and 5,047,492, all expressly incorporated by reference herein. When POSS nanostructures are covalently linked to the polymer chain they act to retard chain motion and greatly enhance time dependent properties such as $T_g$, HDT, Creep and Set, which correlate to increased modulus, hardness, and abrasion resistance. The present invention now shows that similar property enhancements can be realized by the direct blending of nanostructured chemicals into plastics. This greatly simplifies the prior art processes.

Furthermore, because POSS nanostructured chemicals possess spherical shapes (per single crystal X-ray diffraction studies), like molecular spheres, and because they dissolve, they are also effective at reducing the viscosity of polymer systems. This benefit is similar to what is produced through the incorporation of plasticizers into polymers, yet with the added benefits of reinforcement of the individual polymer chains due to the nanoscopic nature of the chemicals (see FIG. 6). Thus ease of processability and reinforcement effects are obtainable through the use of nanostructured chemicals (e.g. POSS, POS) where as prior art would have required the use of both plasticizers and fillers or the covalent linking of POSS to the polymer chains. Additional benefit may be realized by the usage of nanostructured chemicals with monodisperse cage sizes (i.e., polydispersity=1) or from polydisperse cage sizes. Such control over compatibility, dispersability, and size is unprecedented for all traditional filler, plasticizer, and interpenetrating network technologies.

EXAMPLES

General Process Variables Applicable To All Processes

As is typical with chemical processes there are a number of variables that can be used to control the purity, selectivity, rate and mechanism of any process. Variables influencing the process for the incorporation of nanostructured chemicals (e.g. POSS/POS etc.) into plastics include the size and polydispersity, and composition of the nanostructured chemical. Similarly the molecular weight, polydispersity and composition of the polymer system must also be matched with that of the nanostructured chemical. Finally, the kinetics, thermodynamics, and processing aids used during the compounding process are also tools of the trade that can impact the loading level and degree of enhancement resulting from incorporation of nanostructured chemicals into polymers. Blending processes such as melt blending, dry blending and solution mixing blending are all effective at mixing and alloying nanostructured chemical into plastics.

Example 1

Synthesis

Example 1a (Heptadecafluoro-1,1,2,2-tetrahydrodecyl)triethoxysilane (6.10 g), deionized water (0.27 g), and potassium hydroxide (2.088 mg) were added to a 10 mL volumetric flask. The balance of the volume to 10 mL was filled with ethanol. The contents were transferred to a 25 mL round bottom flask with a Teflon covered magnetic stir bar. The contents were stirred at room temperature overnight under nitrogen. A fine white powder was formed. The product was rinsed with ethanol and dried. A 92.3% yield of pure $[(RSiO_{1.5})_8]_{\Sigma 8}$ was obtained. $^{29}$Si NMR δ:—66.76 ppm.

Example 1b (Tridecafluoro-1,1,2,2-tetrahydrooctyl)triethoxysilane (5.10 g), deionized water (0.27 g), and potassium hydroxide (2.088 mg) were added to a 10 mL volumetric flask. The balance of the volume to 10 mL was filled with ethanol. The contents were transferred to a 25 mL round bottom flask with a Teflon covered magnetic stir bar. The contents were stirred at room temperature overnight under nitrogen. A fine white powder was formed. The product was rinsed with ethanol and dried. A 92% yield of pure $[(RSiO_{1.5})_8]_{\Sigma 8}$ was obtained. $^{29}$Si NMR δ:—66.69 ppm.

Example 2

Melt Compounding

Example 2a

Poly(vinylidene fluoride) (PVDF) was used. PVDF (Hylar 460) was obtained from Solvay Solexis. The melting temperature determined by differential scanning calorimetry (DSC) was in the range of 150–164° C. $[(3,3,3\text{-Trifluoropropyl}_n SiO_{1.5})_n]\Sigma_n$ was blended into PVDF using a twin screw extruder (MicroCompounder, DACA Instruments). The PVDF and POSS were mixed thoroughly for 3 minutes at 177° C. Three samples were prepared with POSS weight percents of 2.5%, 5%, and 10%, respectively.

Example 2b

PVDF was used in this study. $[(1H,1H,2H,2H\text{-heptadecafluorodecyl}_n SiO_{1.5})_n]\Sigma_n$ was blended into PVDF using a twin screw extruder. The PVDF and POSS were mixed thoroughly for 3 minutes at 177° C. Three samples were prepared with POSS weight percents of 2.5%, 5%, and 10%, respectively.

Example 2c

Perfluoroalkoxy polymer (PFA) was used in this study. PFA was obtained from duPont. The melting temperature determined by DSC was in the range of 311–319° C. $[(1H,1H,2H,2H\text{-heptadecafluorodecyl}_n SiO_{1.5})_n]\Sigma_n$ was blended into PFA using the twin screw extruder. The PFA and POSS were mixed thoroughly for 3 minutes at 375° C. Two samples were prepared with POSS weight percents of 2.5% and 10%, respectively.

Example 2d

PFA was used in this study. $[(c\text{-pentyl})SiO_{1.5})_7(c\text{-pentyl})(OH)SiO_{1.0})_3]\Sigma_7$ was blended into PFA using the twin screw extruder. The PFA and POSS were mixed thoroughly for 3 minutes at 750° C. A sample was prepared with a POSS weight percent of 2%.

Example 2e

PFA was used in this study. $[(c\text{-pentyl})SiO_{1.5})_7(H)SiO_{1.5})_3]\Sigma_8$ was blended into PFA using the twin screw extruder. The PFA and POSS were mixed thoroughly for 3 minutes at 750° C. A sample was prepared with a POSS weight percent of 5%.

Figure 7:
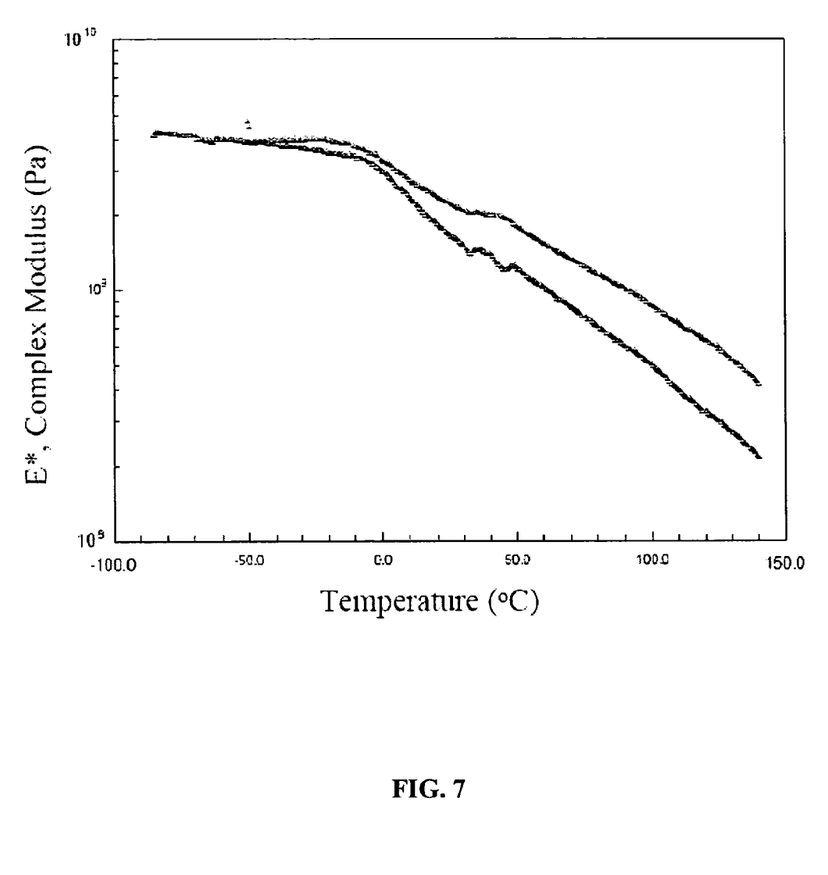
FIG. 7 is a graph of storage modulus (E*) relative to temperature (° C.) for nonreinforced fluoropolymer and POSS-reinforced fluoropolymer.

A series of Nanostructured POSS Chemicals were compounded into fluoropolymer at the 1 wt %–50 wt % level using a twin screw melt extruder operating at 80–120 rpm and 190° C. Both POSS and the polymer were dried prior to compounding to ensure a maximum state of alloying. After compounding, the POSS-reinforced samples were then molded into discs, dogbones and other test specimens and subjected to analysis and characterization. The viscoelastic response as represented by the values for storage modulus (E*) relative to temperature (° C.) of the POSS-reinforced fluoropolymer is shown in FIG. 7.

Figure 9:
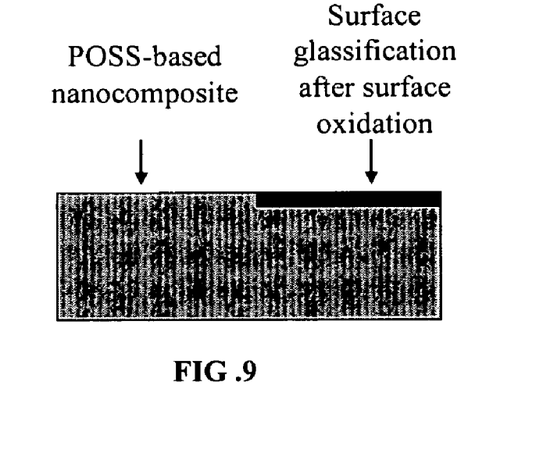
FIG. 9 shows formation of passivating surface layer upon oxidation of a POSS fluoropolymer.
Figure 10:
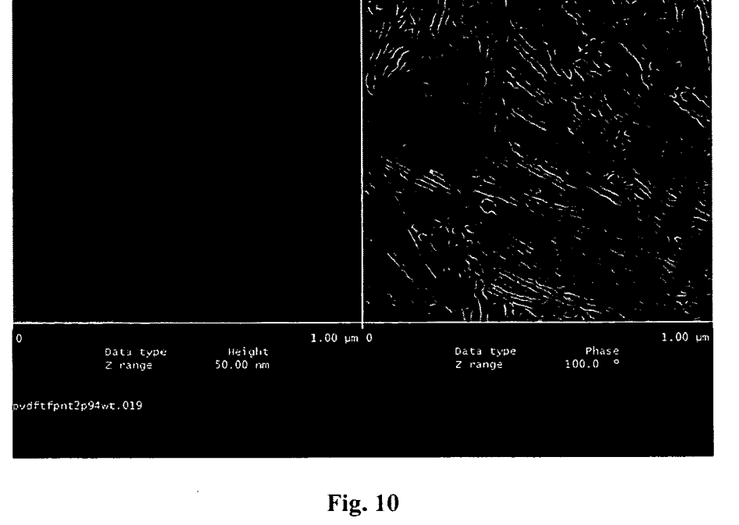
FIG. 10 is an AFM image of 3,3,3-trifluoropropyl$_n$T$_n$ blended into PVDF in 2.94 wt. %. The absence of POSS domains may indicate that the POSS is well dispersed.
Figure 11:
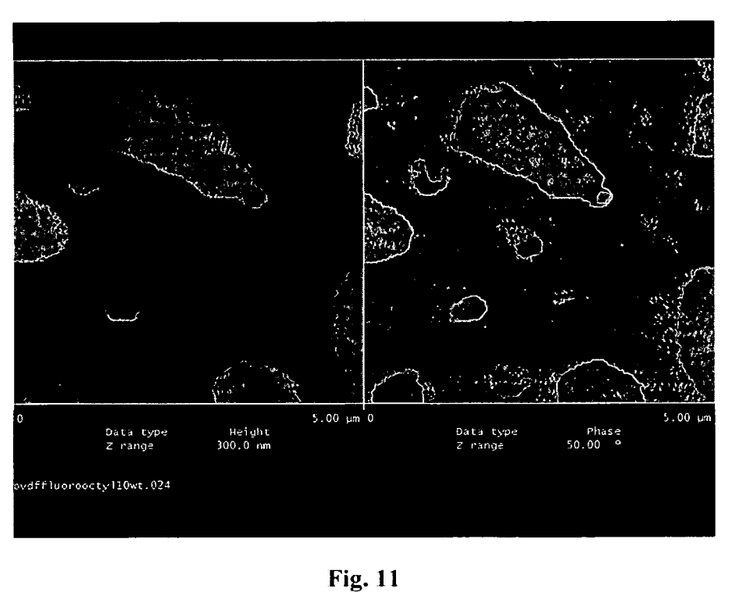
FIG. 11 is an AFM image of 1H,1H,2H,2H-heptadecafluorodecyl$_n$T$_n$ blended into PVDF in 10 wt. %. The POSS appears to be forming domains within the polymer matrix, indicating that the POSS with a longer fluoroalkyl chain is less soluble in PVDF, or that a 10 wt. % blend is too high for this particular POSS compound. 10% 3,3,3-trifluoropropyl$_n$T$_n$ was blended into PVDF with no domain appearance by AFM.

Various sizes of POSS molecular silicas were observed to have a pronounced effect on the degree to which the modulus was retained at elevated temperatures. Overall it was observed that the Octameric [(RSiO$_{1.5}$)$_8$]$\Sigma_8$ and dodecametic [(RSiO$_{1.5}$)$_{12}$]$\Sigma_{12}$ POSS were most effective at retaining the modulus at elevated temperatures. The fracture toughness and other mechanical properties and physical properties of the POSS-alloyed fluoropolymers were also noticeably improved. The mechanism for this enhancement was observed to be the restriction of the motion of the polymer segments and subsequent polymer chains in the fluoropolymer (see FIG. 6). The mechanism erosion resistance in space is attributed to the in situ formation of a passivating glassy surface layer (see FIG. 9). Similar levels of enhancement have been observed for other fluoropolymers (e.g. MFA, PFA, PVDF, TFE, etc.).

Alternate Method: Solvent Assisted Formulation. POSS can be added to a vessel containing the desired polymer, prepolymer or monomers and dissolved in a sufficient amount of an organic solvent (e.g. hexane, toluene, dichlormethane, etc.) or fluorinated solvent to effect the formation of one homogeneous phase. The mixture is then stirred under high shear at sufficient temperature to ensure adequate mixing for 30 minutes and the volatile solvent is then removed and recovered under vacuum or using a similar type of process including distillation. Note that supercritical fluids such as $CO_2$ can also be utilized as a replacement for the flammable hydrocarbon solvents. The resulting formulation may then be used directly or for subsequent processing.

Example 3

Incorporation into Fluorinated Fluids

Nanostructured POSS was compounded into fluoropolymer fluids in the amounts ranging from 1%, to 50%, and various physical properties of the alloyed fluids were measured and compared with the same physical properties of the base fluorpolymer fluid (Table 3). The enhanced properties of POSS-reinforced fluoropolymer fluid are apparent. Similar levels of enhancements were observed with other fluoro polymer fluids and from the incorporation of POSS fluoropolymer fluids into other polymers.

Figure 6:
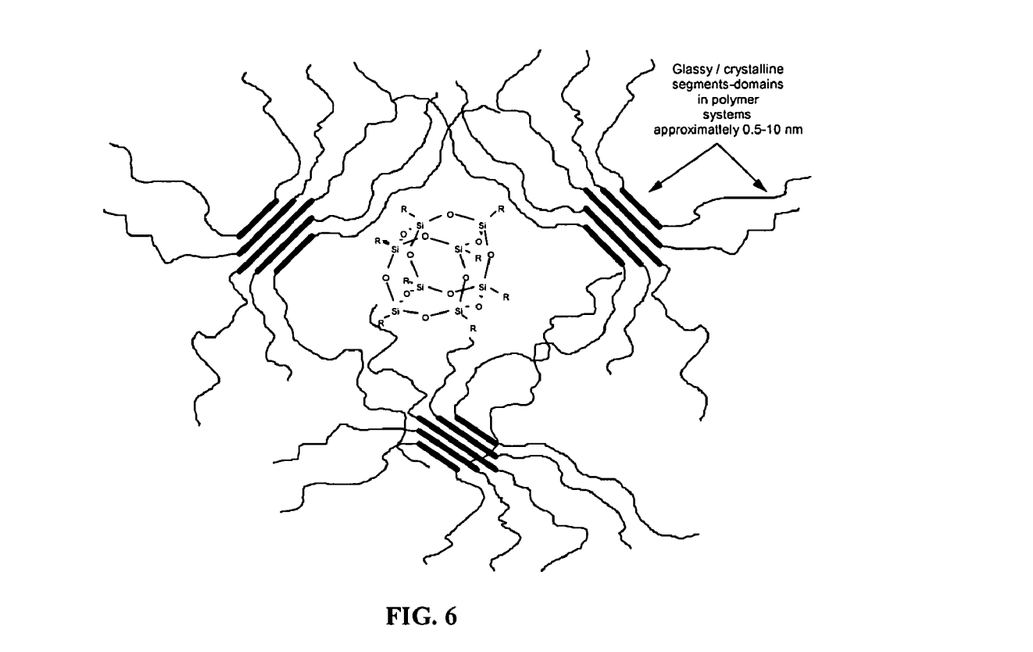
FIG. 6 illustrates a nanoreinforced polymer microstructure.

The mechanism for the physical property enhancements is attributed to the restriction of motion of the polymer chains (see FIG. 6). The mechanism erosion resistance in space is attributed to the in situ formation of a passivating glassy surface layer (see FIG. 9).

Example 4

Figure 8:
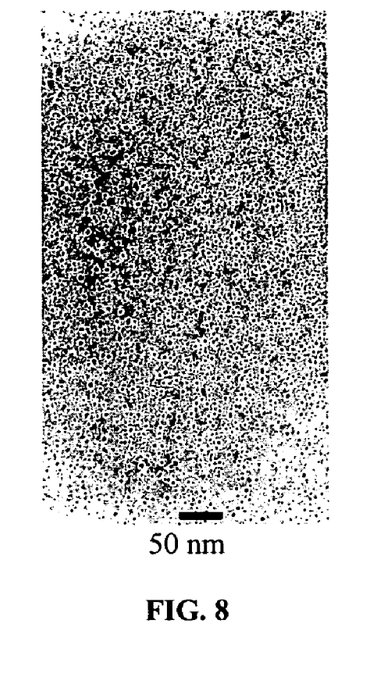
FIG. 8 is a picture of a fluoropolymer showing dispersion of cages at the 1–5 nm level.

A transmission electron micrograph was taken of a fractured POSS fluoropolymer monolith of that was composed of 10% [(RSiO$_{1.5}$)$_8$]$_{\Sigma 8}$) (see FIG. 8), which illustrates the molecular level dispersion that can be achieved in polymers via compounding. Specifically, the black dots in FIG. 8 represent POSS molecular silica dispersed at the 1 nm to 3 nm level.

The invention claimed is:

1. A method of alloying a nanostructured chemical selected from the group consisting of POSS and POS into a fluoropolymer, comprising the step of compounding the nanostructured chemical into the fluoropolymer.

2. A method according to claim 1, wherein a plurality of nanostructured chemicals is compounded into the polymer.

3. A method according to claim 1, wherein the fluoropolymer is in a physical state selected from the group consisting of oils, amorphous, semicrystalline, crystalline, elastomeric and rubber.

4. A method according to claim 1, wherein the fluoropolymer contains a chemical sequence and related polymer microstructure.

5. A method according to claim 1, wherein the fluoropolymer is a polymer coil, a polymer domain, a polymer chain, a polymer segment, or mixtures thereof.

6. A method according to claim 1, wherein the nanostructured chemical reinforces the fluoropolymer at a molecular level.

7. A method according to claim 1, wherein the compounding is nonreactive.

8. A method according to claim 1, wherein the compounding is reactive.

9. A method according to claim 1, wherein a physical property of the fluoropolymer is improved as a result of incorporating the nanostructured chemical into the fluoropolymer.

10. A method according to claim 9, wherein the physical property is selected from the group consisting of adhesion to a polymeric surface, adhesion to a composite surface, adhesion to a metal surface, water repellency, density, low dielectric constant, thermal conductivity, glass transition, viscosity, melt transition, storage modulus, relaxation, stress transfer, abrasion resistance, fire resistance, biological compatibility, gas permeability, porosity, and optical quality.

11. A method according to claim 1, wherein the compounding step is accomplished by blending the nanostructured chemical into the fluoropolymer.

12. A method according to claim 11, wherein the compounding step is accomplished by a blending process selected from the group consisting of melt blending, dry blending, and solution blending.

13. A method according to claim 1, wherein the nanostructured chemical functions as a plasticizer.

14. A method according to claim 1, wherein the nanostructured chemical functions as a filler.

15. A method according to claim 1, wherein the nanostructured chemical is selectively compounded into the fluoropolymer such that the nanostructured chemical is incorporated into a predetermined region within the fluoropolymer.

16. A method according to claim 1, wherein the molecular motion of a fluoropolymer is controlled by comprising compounding the nanostructured chemical into the fluoropolymer.

17. A method according to claim 16, wherein a time dependent property is enhanced as a result of compounding the nanostructured chemical into the fluoropolymer.

18. A method according to claim 17, wherein the time dependent property is selected from the group consisting of $T_g$, HDT, modulus, creep, set, permeability, erosion resistance, abrasion resistance.

19. A method according to claim 15, wherein the nanostructured chemical has chemical properties compatible with the predetermined region of the fluoropolymer, whereby the compounding reinforces the fluoropolymer.

* * * * *